(12) United States Patent
Hillermeier et al.

(10) Patent No.: US 7,867,568 B2
(45) Date of Patent: Jan. 11, 2011

(54) CONTINUOUS PULTRUSION PROCESS FOR PRODUCING HIGH PERFORMANCE STRUCTURAL PROFILES

(75) Inventors: Roman Hillermeier, Stade (DE); Lars Friedrich, Stade (DE)

(73) Assignee: Airbus Operations GmbH, Hamburg (DE)

( * ) Notice: Subject to any disclaimer, the term of this patent is extended or adjusted under 35 U.S.C. 154(b) by 437 days.

(21) Appl. No.: 11/632,374

(22) PCT Filed: Jul. 26, 2005

(86) PCT No.: PCT/EP2005/008114

§ 371 (c)(1), (2), (4) Date: Jan. 12, 2007

(87) PCT Pub. No.: WO2006/010592

PCT Pub. Date: Feb. 2, 2006

(65) Prior Publication Data

US 2008/0145634 A1    Jun. 19, 2008

(30) Foreign Application Priority Data

Jul. 27, 2004    (EP)    ................................ 04017696

(51) Int. Cl.
*B05D 3/02*    (2006.01)
(52) U.S. Cl. .................... 427/384; 427/385.5; 427/386; 427/389.9; 427/392; 427/394; 427/396; 427/369; 427/370
(58) Field of Classification Search ........................ None
See application file for complete search history.

(56) References Cited

U.S. PATENT DOCUMENTS

| 3,816,365 | A | * | 6/1974 | Schmid et al. | ........... 528/111.3 |
| 4,487,948 | A | * | 12/1984 | Shimp et al. | ................. 549/552 |
| 4,544,732 | A | * | 10/1985 | Corley | .......................... 528/90 |
| 4,874,833 | A | * | 10/1989 | Kershaw | ...................... 528/90 |
| 4,972,031 | A | * | 11/1990 | Choate et al. | ................ 525/535 |
| 5,098,496 | A | * | 3/1992 | Breitigam et al. | ........... 156/180 |

(Continued)

FOREIGN PATENT DOCUMENTS

WO        WO 03/040206        *    5/2003

OTHER PUBLICATIONS

Blosser et. al., Continuous Resin Transfer Molding™ of High Quality, Low Cost, Constant Cross Section, Composite Structural Elements, 39th International SAMPE Symposium, Apr. 11-14, 1994, pp. 1961-1972.

*Primary Examiner*—Erma Cameron
(74) *Attorney, Agent, or Firm*—Jenkins, Wilson, Taylor & Hunt, P.A.

(57) ABSTRACT

The invention provides a continuous pultrusion process for producing structural profiles wherein a) one or more textile sheets are impregnated with a resin composition comprising a combination of (i) at least one epoxy resin which is a tri- or tetrafunctional epoxy resin and (ii) a curing agent system comprising at least two types of reactive groups of different reactivity b) the impregnated textile sheets are subjected to heat to cause a partial reaction between the at least one epoxy resin and the curing agent system, so that the viscosity of the resin composition is increased, and c) the partially reacted impregnated resin composition is gelled using heat and/or pressure.

21 Claims, 6 Drawing Sheets

U.S. PATENT DOCUMENTS

| | | | |
|---|---|---|---|
| 5,110,867 A * | 5/1992 | Schutyser et al. | 525/114 |
| 7,008,555 B2 * | 3/2006 | Hayes et al. | 252/182.13 |
| 2004/0242836 A1 * | 12/2004 | Hayes et al. | 528/124 |
| 2004/0247882 A1 * | 12/2004 | Kouchi et al. | 428/413 |

* cited by examiner 5  6  7  8

CONTINUOUS PULTRUSION PROCESS FOR PRODUCING HIGH PERFORMANCE STRUCTURAL PROFILES

The present invention relates to a new process for producing high performance structural profiles using a modified pultrusion process. The new process is a continuous process which produces structural profiles which have excellent properties and in particular have excellent mechanical properties such as high flexural moduli and strength, in particular high compression strength, such as open hole and filled hole and plain compression strength, and excellent bearing properties which make the structural profiles suitable in particular for aircraft applications.

Fiber-reinforced plastic materials have become of increasing importance. Such materials combine an excellent strength with a very low weight, which makes them the first choice for weight-sensitive applications, in particular in the aircraft industry. Fiber-reinforced plastic materials principally consist of several fibers or sheets of fibers which are laminated together by a plastic material, usually a resin. However, to be suitable for high-performance applications in particular in the aircraft industry, resin-reinforced fibers must be of excellent strength. An important requirement for reinforcing materials for use in the aircraft industry are the compression properties of which plain compression, open hole compression and filled hole compression strength as described e.g. ASTM Standard D 6484-99 are defining critical design criteria.

There are numerous methods for the fabrication of composite structures, including but not limited to thermoforming polymeric matrices and autoclave processing. However, all are either labor intensive, more costly than using purely metallic materials, not applicable to moderate to high volume applications, or do not result in high structurally efficient structures. The prior art processes are generally batch-oriented, as those employed for autoclave cured structures.

Fabrication of complex structural profiles is a labor intensive process typically consisting of cutting and draping reinforcements to facilitate the conformance of planar materials to non planar geometries. The cost of the resulting structures is high, requires considerable time to produce and the process is prone to errors. Even utilizing automated material placement systems which are known in the art, such as advanced tow placement, the time required to produce a structure, the cost and potentially the part quality are less than optimal.

There are pultrusion processing methods known in the art in which heat-cured, pultruded, composite structures can be produced at moderate to high production rates. However, generally, a limitation of pultrusion processes is that a pultrusion process is adapted only to produce straight elongated parts of uniform cross-section. This is due in part to the nature of the process itself and in part due to the thermoset resins that are most often used. Because the process operates by pulling long continuous reinforcing fibers through the various unit operations, it naturally forms elongated composites in which the reinforcing fibers are aligned in the direction of the pultrusion. Once cured, thermoset resins cannot be subsequently thermoformed or shaped in any other manner, yet it is necessary to cure the thermoset resin at the die in order to bind the fibers together and to create the desired cross-sectional shape.

Usually, in these processing methods a resin system is employed that sacrifices structural performance for rapid processing. Therefore, conventional pultruded structures are generally unsuitable for primary structural applications due to their less than optimal structural performance. Lower structural performance is due to non-optimal fiber orientations in the fabric and the necessity of using rapid curing resins that have non-optimal structural performance.

Reinforcing textiles are sometimes also referred to as fabrics, textile sheets, textile reinforcements, reinforcements, etc. or simply textiles. All those terms which essentially mean reinforcing textiles are synonymously used in the art and are also used in this application.

These and other problems are known in the art and discussed e.g. in U.S. Pat. No. 6,033,511. For overcoming these problems U.S. Pat. No. 6,033,511 suggests a pultrusion fabrication process wherein a preform of multiple layers of fabric is pulled through a bath of liquid matrix material, the matrix material is uniformly dispersed in the preform and solidified by removing heat from the matrix material, the preform with the solidified matrix material is cut and cured preferably by using electron beam cure. This process is still rather complicated, requires an electron beam curing device and the problems of the prior art processes and products are not sufficiently solved.

Furthermore, the sheets which are subjected to the pultrusion process are subjected to strong pulling forces which restricts the number and type of textiles used in this process and requires a high amount of stitching if multiple sheets are to be used.

On the other hand pultrusion has significant advantages as it is a continuous process which provides fiber reinforced plastic materials at relatively low cost. A very high number of literature exists regarding the pultrusion process and it can e.g. be referred to U.S. Pat. No. 6,048,427, U.S. Pat. No. 5,716,487, U.S. Pat. No. 6,033,510 and Meyer, R. W. "Handbook of Pultrusion Technology", Chapman and Hall, New York, N.Y. 1985.

U.S. Pat. No. 5,098,496 discloses a pultrusion process for producing an article of a fiber reinforced thermosetting polymer wherein the pull rate and the temperature of the heating and cooling sections of the die of the pultrusion apparatus are controlled to gel the polymer composition during the pulling through the die so that the article will retain a non-trivial shape. The controlling is in response to the viscosity and the cure kinetics of the polymer composition and the non-trivial cross-sectional shape of the article.

As suitable components of the heat hardenable liquid thermosetting polymerizable composition standard low viscosity materials are described and the whole material technology is based on bifunctional expoxies which are generally used in prior art pultrusion processes. Accordingly, while it is mentioned in U.S. Pat. No. 5,098,496 that the thermosetting polymerizable composition can be applied to the reinforcing fibers in a variety of ways, the preferred method of applying the thermosetting polymerisable resin composition is by passing the fibers through a bath (dip coating in a bath). Such a method requires a low viscosity of the liquid thermosetting polymerizable composition at room temperature if good impregnation of the fibers should be reached and accordingly in the process of U.S. Pat. No. 5,098,496 reactive monomers must be used to reduce the viscosity of the resin.

With the low viscosity resin composition used for impregnating the fibers in the process of U.S. Pat. No. 5,098,496 it is not possible to produce high performance material which is suitable for aerospace applications because these materials do not meet the $T_g$, compression, etc. required for these applications. Furthermore, because of the high pulling forces required in this process high performance textiles such as multiaxial fabrics can not be used in this process and the fibers used in the process of U.S. Pat. No. 5,098,496 are usually aligned parallel to the flow of material, which means that all fibers are in 0°, which is typical for a standard pultrusion process.

Resin transfer molding (RTM) processes are well known for producing a high performance material as it is required by the aircraft industry. The RTM process is more suitable for processing of two-dimensional sheets to three-dimensional reinforcing articles than the classic pultrusion process discussed above and generally sheets of carbon fiber or other material such as aramid fibers or glass fibers are formed around or into a mold or mandrel and are conformed thereto by pressure. Once the layers are formed in the mold, a resin is than injected into the mold to bind the sheets together. The initial sheets of reinforcing material in the classic RTM process do not include the resin and thus are dry and readily pliable. The mold is then heated to allow the resin to cure. Typical examples of RTM process are described e.g. in Beckwith, S. W., Hyland, C. R. "Resin Transfer Molding", SAMPE Monograph No. 3, Covina, Ca. (1999). The typical RTM process is usually a non-continuous or only partially continuous process.

A problem with known RTM processes is that the loading of the dry reinforcement layers into the mold takes time and manpower which makes this process rather expensive. Therefore, RTM processes have been developed which use preforms which already have the desired shape and which are prepared e.g. by tying the layers together with reinforcement strands or by using a viscous liquid or solid resin as an adhesive to hold the layers together. U.S. Pat. No. 5,071,711 discloses a process for preparing preforms, wherein onto the surface of each of one or more plies of an unimpregnated substrate material, one or more non-sintering thermoplastic-like resinous compounds are applied which are substantially free of any compound which would serve as a cross-linker for the thermoplastic solid resinous compound. The resinous compound is in the form of a powder having a particle size less than about 500 μm and having a melting point as determined by DSC of from about 50° C. to about 70° C. The powder thermoplastic-like resinous compounds are then fused into a film on the surface of the substrate material, the resinous material is cooled, one or more plies of the thus treated substrate material are assembled and formed into a desired shape. The shaped plies of treated substrate material are then subjected to a temperature sufficient to melt the resinous compound, and after cooling to a temperature below the melting point of the resinous compound a preshaped preform for use in molding processes as reinforcing material is obtained. The preform can then be stored and eventually used in RTM processes.

However, it is difficult to obtain high performance structural profiles with the RTM process which meet the high requirements of the aerospace industry as discussed above. The viscosity of the resin used in the RTM process must be low to ensure that the resin is evenly distributed throughout the (multilayer) sheets which often results in insufficient mechanical properties of the finished product.

Many problems of pultrusion and RTM techniques can be avoided by using a prepreg technology. Prepreg technology has the advantage that stitching can be reduced or even completely avoided, and it is possible to use additives such as elastomers or thermoplastics in the prepreg resin for increasing the impact resistance of the resulting composite materials. Such additives, which may be added in particle form or simply dissolved into the thermosetting resin, cannot be used in RTM techniques because they would increase the viscosity too much or in case of particles they would filter out during the impregnation process.

An example of a prepreg process is described e.g. in U.S. Pat. No. 5,043,126. U.S. Pat. No. 5,043,126 discloses a process, wherein a fiber-reinforced plastic material is formed by intermittent strong pressurization and heating for thermosetting and fed little by little in pressure-released periods. In the process, a preimpregnated carbon fiber, aramid or glass fiber sheet, which has a thermosetting resin impregnated into the sheet, is used as a basic material of the fiber reinforced plastic material, using the carbon fiber, the aramid or glass fiber in the form of a woven fiber sheet or a unidirectional fiber sheet. Depending upon the shape of the final product roving is interposed between overlapped material sheets.

A continuous injection of the resin into the sheets is not possible in the process of U.S. Pat. No. 5,043,128, since the transport of the reinforcing sheets has to stop while pressure and heat are applied. Thus, the process of U.S. Pat. No. 5,043,129 is restricted to using prepregs.

Prepreg technology has many advantages, in particular it is possible to obtain structural profiles having excellent mechanical properties, however, in a prepreg typically the textile sheet or lay-up has to be achieved via a very labor or equipment intensive process which is a disadvantage which makes the product expensive. Furthermore, the preimpregnated sheets (prepregs) have to be stored usually under cooling which is also uneconomical.

It is the object of the present invention to provide an economic process for producing high performance structural profiles, which are fiber reinforced plastic materials and an apparatus for carrying out this process which overcomes the problems of the prior art processes and which can produce high performance structural profiles of a very high strength in particular of excellent compression such as plain or open hole compression strength, which satisfies the requirements of the aeroplane industry. The process should allow to use highest performing textile reinforcements, which in turn means textile reinforcements with a minimum amount of crimp. It is a further object of the present invention to provide novel high performance structural profiles.

This object is achieved by a continuous pultrusion process for producing structural profiles such as high-performance structural profiles wherein
a) one or more textile sheets are impregnated with a resin composition comprising a combination of
   (i) at least one epoxy resin which is a tri- or tetrafunctional expoxy resin and
   (ii) a curing agent system comprising at least two types of reactive groups of different reactivity
b) the impregnated textile sheets are subjected to heat to cause a partial reaction between the at least one epoxy resin and the curing agent system, so that the viscosity of the resin composition is increased, and
c) the partially reacted impregnated resin composition is gelled using heat and/or pressure.

The invention also provides an apparatus which can be used for carrying out a preferred process of the present invention and novel structural profiles in particular high performance structural profiles which can be used in the aeroplane industry, which are obtainable by the process of the invention.

The process of the present invention allows the application of very low pulling forces. For example the pulling forces in correlation to the profile geometry used in the examples of U.S. Pat. No. 5,098,496 are ten times higher than the pulling forces typically used in the process of the present invention (comparing the laminate surface). Thus, the process of the present invention allows the use of any kind of fiber orientation and very delicate high performance textiles can be used in the process of the present invention, while e.g. a conventional pultrusion process such as disclosed in U.S. Pat. No. 5,098,496 has to use fibers which are usually aligned parallel to the flow material.

Preferably, in the process of the invention as many textile reinforcement sheets as possible are utilized that are not created by typical means of conventional weaving, braiding, or stitching processes.

Through the process of the present invention textile reinforcements can be used that contain a minimum of crimp, in other words in these reinforcements the fibers exhibit a high degree of alignment. If e.g. stitch-bonded multiaxial textiles, such as so-called non-crimp fabrics, are employed, a minimum amount of stitching content is sufficient for the use in the process of this invention. For instance textile sheets can be utilized that have 3 wt.-% or less, more preferably 2 wt.-% or less in particular 1 wt.-% or less stitching yarn or no stitching yarn at all is required. The percentages are based on the total weight of the starting textile sheets without binder. The stitching referred to above is in particular stitching with stitching yarn that does not dissolve or melt into the resin matrix.

A significant advantage of the process of the present invention is that the textile sheets are aligned into the pulling direction of the profile/machine, reducing the fiber waviness which ultimately helps increasing compression strength of the produced structural profile.

Unexpectedly it was found that high performance structural profiles which meet performance characteristics that can be typically only be achieved by processes using prepregs as a starting material can be obtained by using dry, unimpregnated textiles in a pultrusion process in particular an injection pultrusion process if a certain resin composition is used for impregnating the textiles.

A particular advantage of the present invention is that the process can be carried out with all kind of textiles. The novel resin composition allows the application of very low pull forces in the pultrusion process and therefore textiles can be used in the pultrusion process of the present invention which could not be used with prior art pultrusion processes. Prior art pultrusion processes required woven textiles, non-woven textiles (veil/felt-type), non-crimp textiles or UD-fabrics that are woven or stitched. While such textiles can of course also be used in the process of the present invention, it is also possible to use unidirectional tapes ((UD-tapes) that are not woven nor contain any stitching (which does not dissolve) as means of textile stabilization, the UD-tapes are hold together by means of an adhesive usually applied in form of a stitching yarn that dissolves into the bulk matrix. The latter textiles can be obtained by an assembly of UD-plies which are bonded together using an adhesive similar to the one used for UD-tapes (i.e. either a thermoplastic or a thermoset adhesive). Due to the low pull forces which can be used in the present invention very pull-sensitive, textiles such as +/−45 deg biaxial textiles can be processed. Therefore, in the process of the present invention literally any lay-up sequences can be obtained or processed, providing freedom of design and reducing weight.

Since the textiles of this invention contain a minimum or no stitching with not dissolving or melting stitching yarn, the fibers/tows exhibit a very small level of crimp, much less than in woven textiles or stitched textiles with stitching thread that does not dissolve as is usually used in pultrusion applications. Excellent in-plane properties such as in-plane compression strength are provided.

Therefore, preferably the textiles used in the present invention are unidirectional tapes (UD-tapes) and multiaxial fabrics as defined above, preferably combinations of such unidirectional tapes and multiaxial fabrics. Unidirectional tapes are preferably non-crimp type, unstitched, adhesive melt yarn stabilized unidirectional tapes, non-crimp type, stitched with meltable/dissolvable stitching thread, unidirectional tapes or woven type unidirectional tapes with more than 90% of fiber weight in warp direction. Multiaxial fabric are preferably non-crimp type, with low or no stitching content or stitching thread that dissolves/melts into matrix or flat tow woven textiles or non-crimp weaves. Most preferred is a combination of such multiaxial fabrics in particular biaxial or triaxial fabrics and unidirectional (UD) tape. The UD tape is preferably fixed onto the multiaxial fabric using an adhesive (or termed binder, as described below) or using a stitching thread that can dissolve/melt into the matrix.

The mechanical properties are increased if stitching is reduced in particular stitching with yarn that does not dissolve or melt into the resin matrix. Usually, using biaxial textiles higher compression values can be achieved than with triaxial textiles. This can be explained with the orientation of the fibers. Stitching causes crimp of the fibers. This deviation from the direction of the force reduces the compression strength. A triaxial textile contains a third direction in addition the e.g. two +/− sheets (directions) of a biaxial textile. In this case the third direction is a zero degree corresponding to the machine direction and the most loaded direction of the component. If stitching of this zero degree sheet can be avoided, crimp can be reduced, which in turn can result in higher compression strength.

The best performance can be achieved with pure UD textile sheets which do not contain any stitching (with not dissolving or melting yarns) and which allow significant freedom in combining textile sheets to stacks of textile sheets.

Thus preferably in the process of the present invention several textile sheets are used, e.g. four or more textile sheets which have been formed to stacks and each stack contains one or more UD tapes and/or one or more multiaxial textiles.

The stacks of textile sheets can be prepared in a separate process step and the so prepared stacks of textile sheets can then be employed in the pultrusion process of the present invention.

Preferably the different textile sheets are combined to a stack by using a binder. A binder is per definition a material that allows the stabilization of textile sheets without relying on conventional textile means such as weaving or stitching. The binder acts essentially as an adhesive between the textiles sheets. A binder is typically made of either a thermoplastic polymer or a thermosetting polymer, preferably of a thermoplastic polymer. The binder may be incorporated/applied in different forms:

a) Solvated Process

The binder is dissolved in appropriate solvent, the solvent binder is then applied by either dipping/impregnating the textile in the binder solution or by spraying the binder solution onto the textile. The solvent is extracted from binder subsequently using appropriate extraction technique.

b) Powder Hot-Melt Process

The binder is applied onto textile in particle form. By heating the binder melts onto the textile and adheres to it. After this hot melt process the textile can be cooled down.

c) Non-Woven/Hot-Melt Process

The binder is applied/incorporated onto/into the textile in form of a non-woven (textile) sheet material. These non-wovens may be veils, webs, or paper-type materials which are partly or entirely made of binder material. The binder material is in the form of continuous or discontinuous filaments and is made of thermoplastic polymers, either amorphous, semi-crystalline, or crystalline polymers. Preferably these binder filaments are made of semi-crystalline polymers. Preferably the non-woven material is made of semi-crystalline polymers such as polyamides or co-polyamides or blends thereof. The area weight of these non-woven materials should be rather small e.g. between 3 and 30 g/m$^2$, preferably between 5 and 10 g/m$^2$. The non-woven is applied onto the textile using heat and pressure, e.g. in a calendering type equipment, at a temperature which allows the thermal bonding of the non-woven to the textile. This may be above or below the melting temperature, preferably below the melting temperature of the bulk polymer of the veil. Similar to the powder hot melt process, upon the thermal bonding of non-woven the textile can be cooled down.

d) Thermofusable Yarn Hot-Melt Process

Instead of using non-wovens made of a binder material as described under c), filaments or yarns made of this binder material, here called thermofusible yarns, can be used individually to stabilize textiles. These thermofusible yarns, which can be made of the same polymers as described under c) or made of polymers that dissolve in epoxy resins upon impregnation such as polysulfones/polyethersulfones with the latter being preferred, can be incorporated into/onto the textile in almost any fashion. In a preferred example the yarns may be introduced during the weaving process or introduced/applied onto the textiles in a separate process or co-mingled with the bulk fibers of which the textiles are made. By heating the thermofusible yarn and textile to the appropriate bonding temperature the thermofusible yarns start bonding to the surrounding fibers/textiles providing again a stabilized textile structure as described from a) to c).

The processes c) and d) are preferred for forming stacks of the textile materials according to the invention. Most preferred is a process in which different sheets of textiles are bonded together using non-wovens.

According to the present invention the textile sheets can be bonded to stacks of textile sheets separately from the pultrusion process of the invention and textile sheets and stacks of textile sheets can be used which are prepared by any known process or which are commercially available. However, in a preferred embodiment the pultrusion process of the present invention includes the step of forming stacks of textile sheets as described above. Thus in a preferred process in a first process step stacks of textile sheets are prepared using a binder, preferably non-wovens as discussed above and these bonded stacks of textile sheets are then used in situ in the pultrusion process.

When producing the stacks of textile sheets care should be taken to avoid that the binder penetrates too much into the textile sheets which might negatively effect the impregnation of the stacks of textile sheets. Preferably the stacks of textile sheets are prepared by using a temperature and pressure which is selected so that the binder is maintained on the surface of the fibers and ensures a distance between the separate textile sheets in the stacks of textile sheets. Thereby the impregnation of the stacks of textile sheets can be improved (the resin composition used for impregnation can flow between the textile sheets).

In this specification a reference to textile sheets includes stacks of textile sheets if nothing else is particularly mentioned or obvious from the context.

The material of the textile sheets is not particularly restricted and all textile materials which are used in the prior art can be used. Most preferably at least one, more preferably more than one of the sheets consists of carbon fibers but it is also possible to use sheets of other fibers such as aramid fibers or glass fibers alone or in combination with one another or with carbon fibers. If necessary or considered advantageous roving can be provided between the sheets.

In a preferred embodiment of the present invention the textile sheets or the stacks of textile sheets which are bonded together are preformed before they are impregnated with the resin composition. Preferably the textile sheets after preforming are directly drawn into the impregnation device and are not compacted. However, it is also possible that the preformed textile sheets are compacted with a compaction device, such as a press, heated rollers or heated belts to obtain a solid preform. This solid/stabilized preform is then subjected to the subsequent impregnation and gelling process of the present invention. A compaction step significantly increases the stability of the preform. If compacting of the preform is carried out usual temperatures can be 80° C. to 200° C., preferably 160° C. to 190° C., and pressures can be applied in the range of 0.1 to 3 bar, preferably 0.5 to 3 bar. At these temperatures the binder softens and upon cooling a solid preform is obtained. However, care must be taken by the compacting step to retain the impregnability of the preform. This can be achieved by optimizing the pressure and the time during which the pressure is applied and the temperatures under which the pressure is applied.

Due to economic reasons, preferably in the process of the present invention a solid preform is not used but the preformed textile sheets or stacks of textile sheets are directly impregnated after the preforming without prior compacting. The additional compacting step prior the impregnation process is helpful if particular sensitive textiles are used and very thin profile cross-section need to be realized.

Before the textile sheets or stacks of textile sheets enter the impregnation device, it might be advantageous to add rovings at the edge and the core regions in order to fill the cavity in a homogeneous fashion. This minimizes leakage and facilitates the production of a homogeneous product.

Impregnating of the optionally preformed textile sheets or stacks of textile sheets can be effected by pulling the textile sheets or stacks of textile sheets through an impregnating bath as it is known in the art but preferably the textile sheets or stacks of textile sheets are pulled through an impregnation device where the resin composition which is used for impregnation is injected into the textile sheets or stacks of textile sheets in the die under high temperature and pressure (such an impregnation device is termed "injection device"). The injection temperature depends on the resin composition but preferred injection temperatures are in the range of 80° C. to 140° C. more preferably in the range of 90° to 140° C., in particular in the range of 90° C. to 130° C. The injection pressure is preferably in the range of 1 to 10 bar, preferably 1 to 6 bar.

In order to achieve sufficient impregnation in particular when injecting the resin composition the viscosity of the resin composition must not be too high. On the other side after gelling of the resin composition the produced structural profile must have the required mechanical properties. According to the invention it was found that a resin composition comprising a combination of at least one epoxy resin, which is a tri- or tetrafunctional expoxy resin and a certain curing agent system meets these requirements. Usually the resin composition contains more than one epoxy resin.

The epoxy resin present in the resin composition of the present invention is preferably an epoxy resin having at least one amino group. Particularly preferred is a tetrafunctional resin which more preferred has at least one amino group, in particular a tetraglycidylamine epoxy resin such as tetraglycidylaminodiphenylmethane or a trifunctional resin which more preferred has at least one amino group, in particular a triglycidyl epoxy resin such as triglycidyl-p-aminophenol. Preferred is a tetraglycidyl epoxy resin or a combination of a tetraglycidyl epoxy resin and a triglycidyl epoxy resin, in particular as defined above. Particularly preferred the epoxy resin is tetraglycidylaminodiphenylmethane which is available e.g. from Huntsman Advanced Materials under the tradename MY721 but can also be obtained from other suppliers. The trifunctional epoxy resin is preferably a triglycidylamine epoxy resin e.g. triglycidyl-p-aminophenol which is commercially available e.g. under the trademark MY0510 from Huntsman Advanced Materials or with other designations from other suppliers.

The amount of the resins in the resin composition based on the total weight of the resin composition is preferably from 25 to 90% more preferably from 30 to 80%. The amount of epoxy resins in the composition based on the weight of resins in the resin composition is preferably from 25 to 100%, more preferably from 50 to 100% most preferably 75 to 100%. The amount of tetraglycidylamine epoxy resin in the resin composition based on the weight of resins in the resin composition is preferably from 25 to 100% more preferably from 40 to 100%.

The resin composition can contain other resin components in particular bifunctional resins with or without amine groups or other non-amine containing trifunctional or tetrafunctional epoxy resins e.g. elastomer modified bifunctional epoxy resins.

Further minor ingredients may be included as performance enhancing or modifying agents in the resin composition, such as any of the following: accelerators; thermoplastics and core shell rubbers; flame retardants; wetting agents; pigments/dyes; UV absorbers; antifungal compounds; toughening particles; viscosity modifiers; liquid rubbers; antioxidants; inorganic or organic fillers; stabilizers; diluents and plasticizers.

The second important component of the resin composition for use in the process of the present invention is a curing agent system comprising at least two reactive groups of different reactivity, i.e. one of the reactive groups has a higher reactivity than the other of the reactive groups.

The reactive groups of different reactivity can be any functional groups which are capable to react with functional groups of the epoxy resin and preferably at least one of these reactive groups is an amine group, more preferably both groups are amine groups. It is, of course, also possible that the curing agent system contains more than two types of reactive groups, but it is important that the curing agent system contains one type of reactive group which has a higher (lower) reactivity than a second type of reactive group which is also present in the curing agent system.

The term "reactivity" as used in the content of the present invention in connection with a curing agent or a curing agent system refers to the ability of the curing agent (or, more specifically, of a functional group thereof) to react with the epoxy resin (or, more specifically, with a functional group thereof). In the following the invention is mainly further described for the most preferred embodiment, namely that the at least two types of reactive groups of the curing agent system are both amine groups, but it is, of course, also possible to use other reactive groups. For example, one type of reactive group can be provided by a reactive butadiene aryinitrile elastomer (e.g. CTBN, carboxyl terminated butadiene acrylnitrile), and the other type is an amine. Typically, amine groups react faster with epoxy groups than e.g. CTBNs. This is especially true for primary amine groups (—NH2) which are much more reactive with respect to epoxy ring opening reactions. Most aromatic amine curing agents have primary amine functionality. Since a reactive butadiene aryinitrile elastomer usually has a lower reactivity than a (primary) amine, the reactive butadiene acrylnitrile elastomer would provide the reactive group with a lower reactivity, and the (primary) amine would provide the reactive group with the higher reactivity.

According to the present invention, a reactive group of the curing agent system has a "higher" reactivity, if it reacts with the epoxy resin faster and/or under milder conditions, usually at a lower temperature than the other reactive group of the curing agent system. Accordingly, a reactive group of the curing agent system of the present invention has a "lower" reactivity, if it reacts with the epoxy resin slower and/or under more severe reaction conditions, usually at a higher temperature than the other reactive group of the curing agent system.

Inventors do not wish to be bound by theory, but at present it is believed that after injecting the resin composition in step a) of the process, in step b) a controlled viscosity increase occurs which is caused by a reaction of the reactive groups of the curing agent system having a higher reactivity with the at least one epoxy resin. The reaction of the functional groups with a higher reactivity results in a controlled viscosity buildup. Preferably, in step b) of the process of the present invention the viscosity of the resin composition increases from a value in the range of about 10 to 500 mPa·s, more preferably in the range of about 50 to 200 mPa·s at the beginning of step b) to a higher value of the viscosity at the end of step b). The higher value of the viscosity at the end of step b) is preferably in the range of about 100 to 30000 mPa·s, more preferably of about 500 to 10000 mPa·s. Thus, during step b) of the present invention the viscosity of the resin is preferably increased by a factor of 5 to 200, more preferably by a factor of 10 to 150. The viscosity at the beginning of step b) is measured at the temperature at the beginning of step b), and the viscosity at the end of step b) is measured at the temperature at the end of step b). The viscosity measurements are carried out using a parallel plate rheometer. FIG. 6 shows the viscosity and temperature pattern of a typical process of the present invention, with step b) starting 5 minutes after start of the process and ending 15 minutes after start of the process. All viscosity measurements reported and shown in this specification were made with a "Bohlin CSR Rheometer". The samples were run using a 40 mm parallel plate geometry.

In step b) usually no crosslinking occurs or only a very low amount of crosslinking occurs (degree of cure of 0% to 10%), and it is believed that the viscosity increase in step b) is mainly caused by increasing the weight averaged molecular weight of the polymers in the resin composition. This viscosity build-up is important to achieve the required excellent mechanical properties in the final structural profile while reducing the risk of breakage or resin deposit in the device during the stabilization of the resin impregnated textile sheets. The structure of the molecules having the aminofunctional group with a higher reactivity is selected so that mainly only an increase in the weight average molecular weight of the resin polymers can occur but no or no significant crosslinking.

During step c) gelling, i.e. crosslinking, occurs, and the resin composition is hardened. Usually during step c) a degree of cure of 40% or more, preferably 50% or more, e.g. 40% (or 50%) to 90%, preferably 40% (or 50%) to 85%, particularly 40% (or 50%) to 75% is achieved. Thus, during step c) of the process of the present invention the resin composition is gelled and after step c) the shaped textile sheets can be stored or transported prior to further processing by post-curing. However, the curing agent system still contains some reactive groups which can react at the post-curing step under high temperature. Since the shaped textile sheets after step c)

are already gelled and sufficiently stabilized, this final post-curing step needs not to be carried out under pressure. Preferably, the process of the present invention includes the post-curing step under a high temperature as step d), and during this curing step a degree of cure of preferably 90% or more is reached. However, the structural profiles obtained after step c) and prior to post-curing are in itself useful products which have a commercial value. The degree of cure is a known feature for a skilled person and can be measured by DSC (Differential Scanning Calorimetry).

In summary, it is believed that in the process of the present invention in step b) the viscosity of the resin composition is build up in a controlled way by reaction of the functional groups having a higher reactivity, and in step c) gelling occurs by reaction of the functional groups having a lower reactivity.

The curing agent system which is used in the process of the present invention contains at least two different types of reactive groups with different reactivity. In a preferred embodiment of the present invention both reactive groups are amino groups, and use is made of the fact that e.g. primary amino groups have a higher reactivity than secondary amino groups. Furthermore, reactive groups can be hindered in their reactivity by sterical effects, in particular bulky side groups. Amino groups attached to nonaromatic carbohydrates usually have a higher reactivity than amino groups attached to aromatic hydrocarbons.

It is possible that both reactive groups are present on one and the same curing agent. A preferred curing agent which contains both primary amino groups and secondary amino groups is 4-aminodiphenylamine (DPDA)

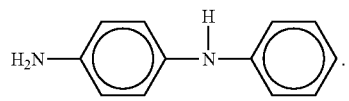

In this molecule the reactivity of the secondary amino group is further reduced by the presence of the bulky phenyl groups. If 4-aminodiphenylamine is used as curing agent system with two types of reactive groups having different reactivity, the controlled viscosity build-up is probably achieved by a reaction of the primary amino groups with the epoxy resin. The reaction conditions during this reaction step are not sufficiently severe (the temperature is not sufficiently high or the heating time is not sufficiently long) to cause a reaction of the sterically hindered secondary amino groups. The end product of this reaction step is a somewhat stabilized shaped product which is preferably immediately subjected to the gelling in step c), where a high temperature is applied for a sufficient time to effect reaction of the secondary amino group with the epoxy resin (and to complete the reaction of remaining primary amino groups with the epoxy resin, if necessary) and gelling is effected.

In a further preferred embodiment of the present invention the curing agent system contains different curing agents. In this case, the reactive group with a lower reactivity and the reactive group with the higher reactivity are bonded to different curing agents, and the curing agent system used in the process of the present invention contains those different curing agents. Curing agents having a relatively low reactivity are e.g. monoaromatic diamines such as diethyltoluenediamine (DETDA) or aromatic sulfones such as diaminodiphenylsulfone (DDS). Such curing agents having a relatively low reactivity can advantageously be combined with a curing agent having a higher reactivity such as a cyclic non-aromatic amine, such as p-aminocyclohexylmethane (PACM). As explained above, during the controlled viscosity buildup in the process of the present invention the amine functional groups with the higher reactivity such as the amine functional groups in PACM react with the epoxide, and during step c) the amine functional groups having a lower reactivity effect the gelling, e.g. the amine functional groups of the DDS and/or the DETDA.

The following embodiments of the present invention are particularly preferred:
a) The curing agent system contains one curing agent having a relatively high reactivity such as PACM and one or more curing agents having a relatively low reactivity such as DETDA and/or DDS.
b) The curing agent system contains one curing agent having functional groups with a relatively high reactivity and functional groups with a relatively low reactivity such as DPDA and one or more curing agents having a relatively high reactivity such as PACM.
c) The curing agent system contains one curing agent having functional groups with a lower and with a higher reactivity such as DPDA and one or more curing agents having functional groups with a lower reactivity such as DETDA and/or DDS.

The process of the present invention can be easily controlled by suitably choosing the curing agent system in order to achieve a high difference in the reactivity of the curing agents in the curing agent system and by adjusting the amounts of the curing agents in the curing agent system. Suitable curing agent systems can be found by a skilled person on the basis of the examples provided in this specification, the published reactivities of curing agents and, if necessary, some simple routine experiments.

Preferably the temperatures at which the reactive groups of the curing agent system with the lower reactivity and the reactive groups of the curing agent system with the higher reactivity are caused to react with the epoxide resin differ by 5° C. or more, more preferably by 10° C. or more, still more preferably by 20° C. or more. At a given temperature, thus the functional groups with a higher reactivity react with the epoxide resin faster than the functional groups with a lower reactivity.

The amount of the curing agent system in the resin composition is not particularly limited and preferably ranges from 10 to 75 wt.-%, more preferably from 20 to 70% based on the total weight of the resin composition. If the curing agent system contains one or more agents with a higher reactivity and one or more curing agents with a lower reactivity, preferably the amount of the curing agent with a higher reactivity (reacting at lower temperatures) based on the total amount of curing agents in the resin composition is from 10 to 90 wt.-%, more preferably from 20 to 80 wt.-%, and the amount of the curing agent with a lower reactivity based on the total amount of curing agents in the resin composition is from 10 to 90 wt.-% preferably from 20 to 80 wt.-%.

If a curing agent is present in the curing agent system which provides both, functional groups with a lower reactivity and functional groups with a higher reactivity, it is partly considered as a curing agent with a higher reactivity and partly considered as a curing agent with a lower reactivity.

If the curing agent with the higher reactivity is a cyclic non-aromatic amine, in particular para-aminocyclohexylmethane, the amount of this curing agent based on the total amount of curing agents in the resin composition is preferably 5 to 50 wt.-%, more preferably 10 to 40 wt.-%. In this case the amount of the curing agent with a lower reactivity, e.g. the one or more aromatic amines, in particular diethyltoluenediamine and/or diaminodiphenylsulfone, based on the total amount of curing agents in the resin composition is from 50 to 95 wt.-%, more preferably 60 to 90 wt.-%.

If a curing agent is present which has functional groups having a higher reactivity and functional groups having a lower reactivity, such as 4-aminodiphenylamine, the amount of the curing agent having the higher reactivity is e.g. from 0 to 70%, more preferably from 0 to 60%, the amount of the curing agent with the lower reactivity is preferably from 0 to 80%, more preferably 0 to 70%, and the amount of the curing agent having both functionalities is preferably from 20 to 100%, more preferably from 30 to 100%.

For example, in an embodiment of the present invention the curing agent system contains a curing agent having both functionalities, such as 4-aminodiphenylamine, and a curing agent having a lower reactivity, such as diaminodiphenylsulfone, and a curing agent with higher reactivity, such as para-aminocyclohexylmethane. In such a system, the amount of the diaminodiphenylsulfone based on the total amount of the curing agent system in the resin composition preferably is from 10 to 50 wt.-%, more preferably from 20 to 40 wt.-%, the amount of the 4-aminodiphenylamine preferably is from 20 to 60 wt.-%, more preferably from 30 to 50 wt.-%, and the amount of the para-aminocyclohexylmethane constitutes the rest of the curing agent system.

It goes without saying that the amounts of the curing agents of the curing agent system have to be chosen so that the total amount of the agents does not exceed 100%. All percentages are by weight, if nothing else is stated.

In the pultrusion process of the prior art usually curing agents are used which are relatively latent in order to provide an impregnating resin composition with low viscosity. Such relatively latent curing agents are used e.g. in the pultrusion process as disclosed in U.S. Pat. No. 5,098,496. The use of such a relatively latent curing agent often requires the co-use of a suitable amine cure accelerator which acts as a catalyst. In U.S. Pat. No. 5,098,496 trialkylsulfonium salts containing anions of low nucleophilicity are used as such amine cure accelerators. Contrary thereto, in the process of the present invention it is preferable to use amine curing agents which are less latent, as the impregnating resin composition generally has a relatively high viscosity, in particular if the impregnation is done by injection. Therefore, in the process of the present invention preferably a catalyst (or an amine cure accelerator) is not used and preferably the impregnating resin compositions of the present invention are free of a catalyst.

By using the combination of curing agents according to the present invention it is possible to carefully control the viscosity increase prior to the gelling in step c) and in particular in the preferred embodiment of the present invention in which the resin is applied to the textile sheets or stacks of textile sheets by injection it is possible to separate the injection point from the point on which gelling occurs. For example at the beginning of the injection device (the first ⅔ of the injection device) the textile sheets or stacks of textile sheets are impregnated with the resin composition and the viscosity is increased (steps a) and b) of the process), and in the last part (e.g. last ⅓ part) of the injection device the gelling is effected by applying heat and/or pressure. For example, the increase of the viscosity can take 5 to 15 minutes at temperatures of 110 to 120° C., and the gelling follows at temperatures of 125 to 195° C. for a sufficient time, depending on the specific resin system.

In the above embodiment of the invention the gelling at the second part of the injection device is carried out to a degree so that at the end of the injection device the structural profile is principally cured (e.g. degree of cure of 40 to 75%) and the impregnating device is also the gelation device. In this embodiment because of the bikinetic behavior of the resin system, it takes some time during which the viscosity increases so that the resin remains flexible and soft reducing the risk of breakage and resin separation during transport through the impregnating/gelation device. The bikinetic system is so adjusted that the gelling occurs only in the last part of the impregnating/gelation device and after the gelling occurred the gelled material immediately leaves the impregnating/gelation device so that no more pressure and temperature is applied to the (partially) gelled resin system after step c). The disadvantage of this embodiment of the present invention is that the bikinetic properties of the resin system must be carefully adjusted with respect to the heat, pressure, transport speed and dimension of the impregnating/gelation device. In this embodiment the curing agent with a high reactivity is preferably a cyclic non-aromatic amine, such as p-aminocyclohexylmethane since it is easy to obtain a high difference in reactivity using such a curing agent, in particular if the curing agent with lower reactivity is a monoaromatic diamine such as diethyltoluenediamine and/or DDS. In this embodiment it is not necessary to subject the structural profiles to an additional curing step in a separate gelation device using pressure and temperature. Only the post-curing in an oven using high temperature and long curing times to achieve a cross-linking of 90% or more is usually done.

In the most preferred embodiment of the invention in the injection device viscosity increase is effected to a degree so that at the end of the injection device when the structural profile leaves the injection device (end of step b) of the process of the present invention), the profile is still flexible but the viscosity of the resin is sufficiently high so that it remains within the profile and does not flow out, e.g. by dropping. In this embodiment after leaving the injection device the resin composition is subjected to a further gelling step (step c) of the process of the present invention) preferably using a combination of temperature and pressure. Preferably after the injection device peelply and/or films are positioned on the profile which protect the following gelation device from contamination. At the end of the process the films can be removed from the structural profiles.

As discussed above, problems can occur in a pultrusion process if pressure is applied to the impregnated textile sheets during and after gelling. The resin composition becomes rigid and if the rigid material is moved relative to the device which supplies pressure there is a risk that the rigidified textile sheets break or some resin material is separated from the reinforcing sheets and accumulates in the gelation device. On the other hand, if the transport of the textile sheets is interrupted while pressure is applied the process is not truly a continuous process and the problems occur which are discussed in the introductory part of the present specification.

Therefore, in the most preferred embodiment of the present invention in the impregnating device only a viscosity increase occurs, which prevents the resin composition from dropping from the structural profiles after having left the impregnation device. The partial gelling is realized in a separate gelling device which can apply heat and pressure to the impregnated textile sheets. This sequence can be achieved because of the specific resin system with at least two reactive groups of different reactivity used in the process of the present invention. While the impregnating device is stationary the gelation device is preferably movable. For the time period in which gelation occurs under heat and pressure the gelation device is moved with the same speed in the same direction as the resin impregnated textile sheets so that no relative movement between the textile sheets and the gelation device occurs.

Since there is no relative movement between the textile sheets and the gelation device the problems discussed above cannot occur.

The gelling device can e.g. be in the form of two roles which apply heat and pressure to the resin impregnated textile sheets while rolling with the same speed with which the resin-impregnated textile sheets are transported through the apparatus. However, with such a device it is difficult to achieve sufficient curing. Furthermore, it is difficult to achieve a constant thickness of the (partially) gelled product. Preferred is a gelation device which is a cycle press which is moved with the resin-impregnated textile sheets. The textile sheets which are preferably preformed are injected with the resin composition at an elevated temperature so that the viscosity of the resin system is sufficiently low and at a pressure so that the resin system can completely impregnate the textile sheets. After the impregnating step the viscosity is raised as discussed above (step b)). Therefore, when the resin impregnated textile sheets leave the impregnating device, the resin is sufficiently viscous to stay in the textile sheets. After the resin impregnated textile sheets have left the impregnation device they enter the cycle press at a point X1 and the cycle press applies heat and pressure to the resin-impregnated textile sheets while the cycle press is moved with the same speed and in the same direction as the resin impregnated textile sheets. The temperature of the cycle press is sufficient to cause gelling of the resin composition. After a predetermined time t1 at a predetermined point X2 the cycle press is removed from the impregnated textile sheets and moved back to point X1. While the cycle press applies heat, gelling occurs in the resin impregnated textile sheets, and the applied pressure ensures a uniform thickness of the obtained structural profile. While the cycle press can be adjusted so that the heat applied during one cycle is sufficient to achieve the desired gelling (in this case the distance between X1 and X2 essentially corresponds to the length of the cycle press), it is preferred that the cycle press is adjusted so that the desired amount of gelling is achieved after a few cycles, e.g. after 2 cycles or after 3 cycles or after 4 cycles, etc. Thus, preferably the distance between X1 and X2 is smaller than the cycle press, so that each point of the resin impregnated textile sheets is heated and pressed during several cycles of the cycle press. This mode of operation provides a particularly good constancy of the thickness and avoids the occurrence of separations on the structural profile.

By operating the cycle press, it is preferred that the opening times of the cycle press are as short as possible in comparison to the times during which pressure is applied to the structural profile. Short opening times avoid the occurrence of porosities and delamination. Thus, when the cycle press is opened at point X2, it is moved back to point X1 and closed again as quickly as possible.

The cycle time of the cycle press is not particularly limited, but preferably each cycle is 2 to 120 s, more preferably 10 to 120 s, more preferably 20 to 60 s, in particular 10 to 30 s. FIG. 4 shows the continuity of the process and the press cycle.

Using such a cycle press allows a continuous transport of the textile sheets through the apparatus and continuous injection of the impregnating resin into the textile sheets while nevertheless avoiding a relative movement between the textile sheets and the gelation device while heat and pressure are applied.

This embodiment of the process of the invention is particularly preferred, because the spatial separation of the step in which the viscosity is increased, and the gelling step allows better process security and the demands on the resin system, in particular on the difference between the reactivity of the functional groups of the curing agent system, are not as high as in those embodiments in which the gelation occurs in the impregnation device. In this embodiment of the invention it is preferable to use a curing agent system comprising at least one curing agent having functional groups with a lower reactivity in addition to functional groups with a higher reactivity, such as DPDA.

The temperatures and pressures used in the gelation device depend on the resin used and the velocity with which the reinforcing sheets are transported through the apparatus. The best values for each specific resin system can be found by a skilled person without undue experimentation.

In the gelation device during gelling under heat and pressure most but not all of the cross-linking of the reinforcing resin occurs and usually it is still necessary to complete the curing by heating the structural profile after it leaves the gelation device (post-curing) but the structural profiles prior to post curing are useful intermediate products which can be stored, transported and marketed. Usually in the gelation device 50% to 90%, e.g. 50 to 75%, of the cross-linking occurs.

Due to the particular advantageous resin chemistry employed in the present invention the cross-linking can be controlled very accurately in the pultrusion process and it is possible to adjust the degree of cure of the final product and the consistency of the profiles can be adapted to the customer requirements and their processes for further manipulating the structural profile. For example with a degree of cross-linking (or curing) of 10-40% a kind of "net-shape prepreg" can be obtained. Such a profile is soft at adequate temperature, is a per se marketable product and can be shaped to all kinds of structures by the end user. With such a net-shape prepreg curved profiles and highly integrated structures can be obtained.

With the process of the present invention it is also possible to produce semi-cured profiles having a reduced $T_g$. Such semi-cured profiles have a degree of cross-linking of 40-75%. Such semi-cured profiles have the advantage that they allow a reduction of stress after or during bonding operations and they can preferably be used to produce post-formable profiles. Forming of profiles requires the heating to temperatures which are above the glass transition temperature ($T_g$) and the profiles must then be formed to the near desired shape. Full cure is then achieved by post-curing such a profile in its near desired shape form.

Post-curing is used to increase the amount of cross-linking and with post-curing an amount of cross-linking of preferably 90% or more can be reached. Post-curing is carried out as it is well known in the prior art of pultrusion processing using an oven and high temperatures in the range of 120° C. to 200° C., preferably in the range of 160° C. to 200° C. Post-curing is usually done for 1 to 4 hours, e.g. for about 2 hours.

With the present invention all kinds of structural profiles with constant cross-sections e.g. I-beams, T-beams, Ω-beam, floor beams, curved beams, etc. can be produced.

An apparatus for carrying out the process of the present invention is principally a usual pultrusion apparatus which is well known in the prior art and which contains the modifications which are necessary for carrying out the process of the invention. Such an apparatus is schematically shown in FIG. 1. The apparatus (usually) comprises a creel of rolls 1 which support the sheets of textiles or stacks of textile sheets, a preforming device 2 which optionally includes a press for stabilizing the preform, an impregnating/gelation device 3 which is adapted to allow for impregnation of the textile sheets and to apply the heating sequence required by the process of the present invention, optionally an additional heating device for post-curing (not shown) and the pullers of the pultruder 4 which transport the reinforcing sheets through the apparatus. In the apparatus shown in FIG. 1 the impregnating device, the device in which the viscosity is increased and the gelation device are the same, impregnation, viscosity increase and gelation are carried out in the same device.

The shape of the structural profile defines the build-up of the device in which the viscosity of the resin composition is increased and of the gelation device. The devices have a hollow interior which can be heated and has the same shape and dimensions as the structural profile, e.g. an I-beam, a T-beam, etc. After impregnation the liquid resin composition is confined by the outer walls of the hollow interior of the device, and after viscosity build-up this shape is maintained, because of the high viscosity of the resin composition. The length and the outer dimensions of the devices for viscosity build-up and gelling can be easily found and adapted by a skilled person depending on the particular shape of the structural profile, the resin composition, the used temperatures, the envisaged throughput, etc. Injection devices, cycle presses, etc. are commercially available and can be easily adapted by a skilled person to carry out the process of the invention.

The structural profiles obtained by the process of the present invention are different from prior art profiles e.g. because of the type of materials used.

The high performance structural profiles obtainable by the process of the present invention have excellent properties and in particular a superior compression strength, in particular open hole compression strength as measured according to ASTM standard D6484-99. E.g. for quasi-isotropic lay-ups the open hole compression strength is preferably 270 Mpa or higher, most preferably above 300 Mpa. OHC performance of directed lay-ups such as {55/22.5/22.5/0}, which implies 55% of the fibers have the orientation 0°, 22.5% +45°, 22.5% −45°, and 0% 0°, are preferably above 450 Mpa, most preferably above 470 Mpa. OHC performance of directed lay-ups such as {60/15/15/10}, which implies 60% of the fibers have the orientation 0°, 15% +45°, 15% −45°, and 10% 9'0°, are preferably above 500 Mpa, most preferably above 520 Mpa. This makes them particularly useful for aerospace applications.

If nothing else is stated, percentages mentioned in this specification are on a weight by weight basis.

BRIEF DESCRIPTION OF THE DRAWINGS

The invention is explained in more detail with respect to the following figures.

In FIG. 1 the sheets of textiles are provided on rolls 1. In this example 12 rolls are present each of which can provide a textile sheet or a stack of textile sheets, which are plied together and are then fed into the preforming device 2. In the preforming device 2 the combined textile sheets are formed to a predetermined shape and optionally solidified by an optional press. The preform is then fed into an impregnating device 3 where the resin is injected into the textile sheets. In FIG. 1 the textile sheets are constantly pulled through the whole apparatus by the pullers 4 of the pultruder and the movements of the pullers 4 are indicated by arrows.

FIG. 2 schematically shows a preferred embodiment of the present invention wherein the gelation under heat and pressure occurs in the impregnating device.

The preform 5 enters the combined impregnating and gelation device and the textile sheets are impregnated with the resin composition at position 6 of this device. No significant cross-linking occurs between position 6 and 7 but only a viscosity build-up. The resin composition is evenly distributed throughout the textile sheets. The gelation then occurs between position 7 and 8 so that after gelation the gelled article immediately leaves the combined impregnating/gelation device at 8 so that the risk of breakage or resin deposit in the device is significantly reduced. Between position 6 and 7 no cross-linking occurs or the amount of cross-linking which occurs is low, but the structure is stabilized, while between position 7 and 8 cross-linking occurs preferably to an extent of 50% to 75%. The inner walls of the combined impregnation/gelation device exert pressure on the structural profiles thereby ensuring the shape and a constant thickness of the structural profiles. The gelled material which leaves the impregnating/gelation device at position 8 has the required shape of uniform thickness and can then be post-cured by applying temperature as explained above.

Figure 1:
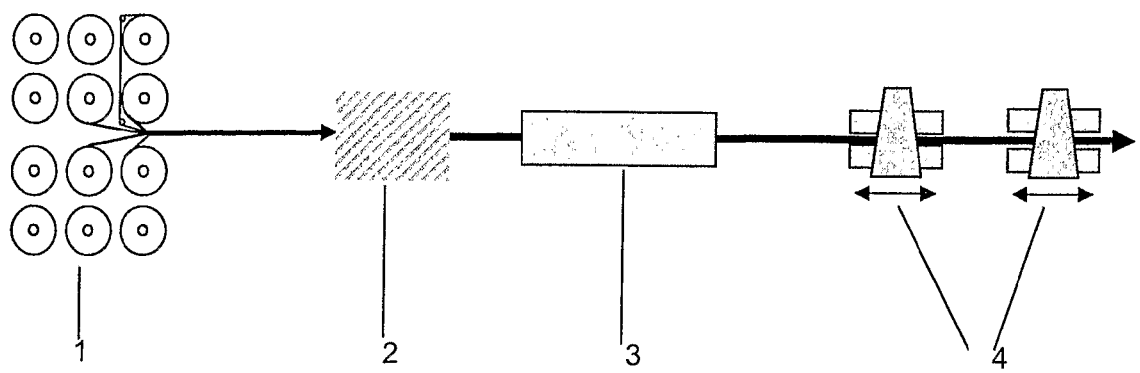
FIG. 1 is a schematical representation of a preferred apparatus for carrying out the process of the present invention.
Figure 2:
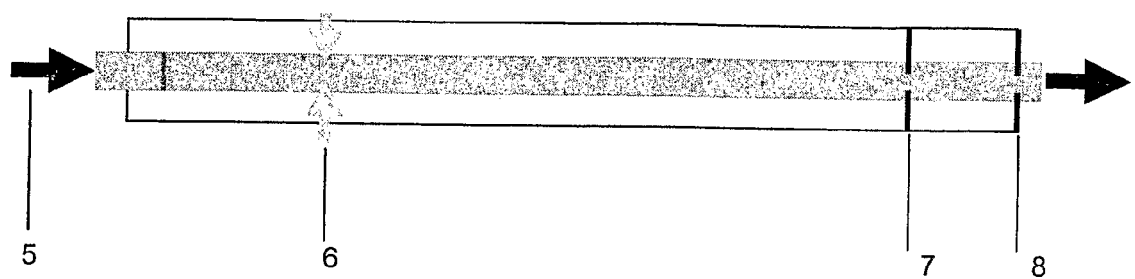
FIG. 2 shows an embodiment of the present invention in which the gelation device and the impregnating device are the same device and in which a resin system with a strong bikinetic behavior is used to reduce resin accumulation in the gelation device.
Figure 3:
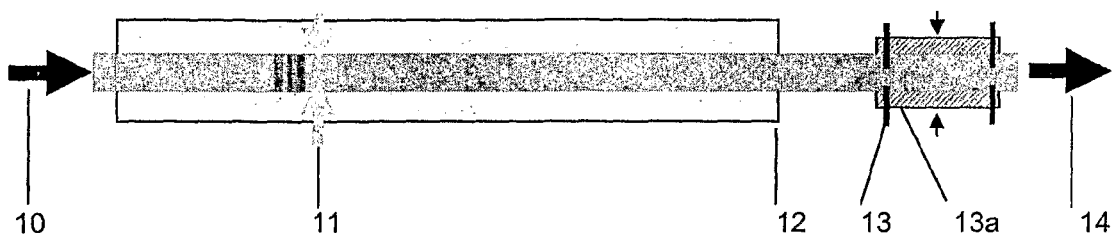
FIG. 3 shows the most preferred embodiment of the present invention in which the impregnating device and the gelation device are spatially separated and the gelation device is a cycle press.
Figure 4:
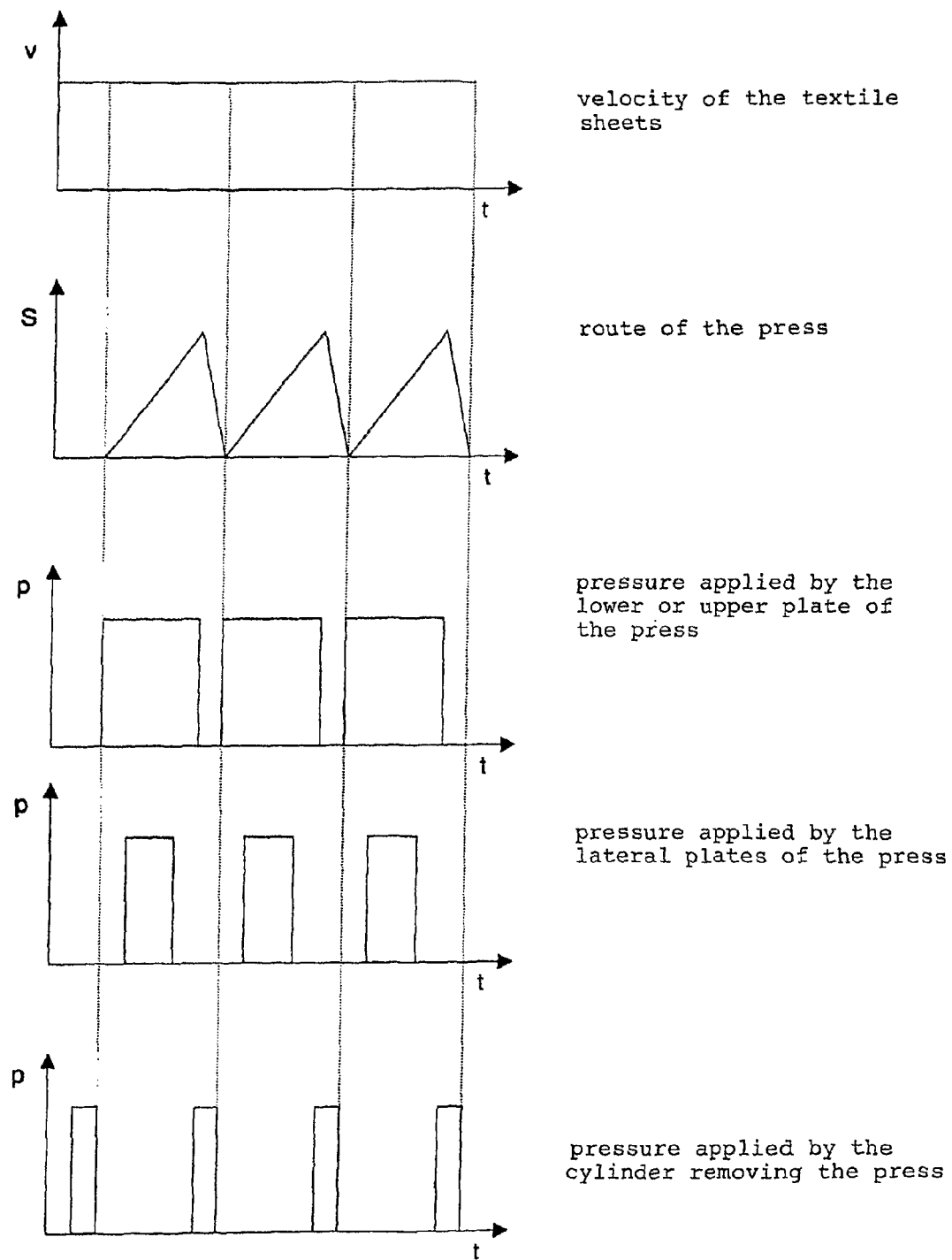
FIG. 4 shows a diagram indicating the continuity of the process and the press cycles using a cycle press which can apply pressure by an upper plate or lower plate and a lateral plate which is useful e.g. for preparing I-beams (preferred embodiment of the present invention).
Figure 5:
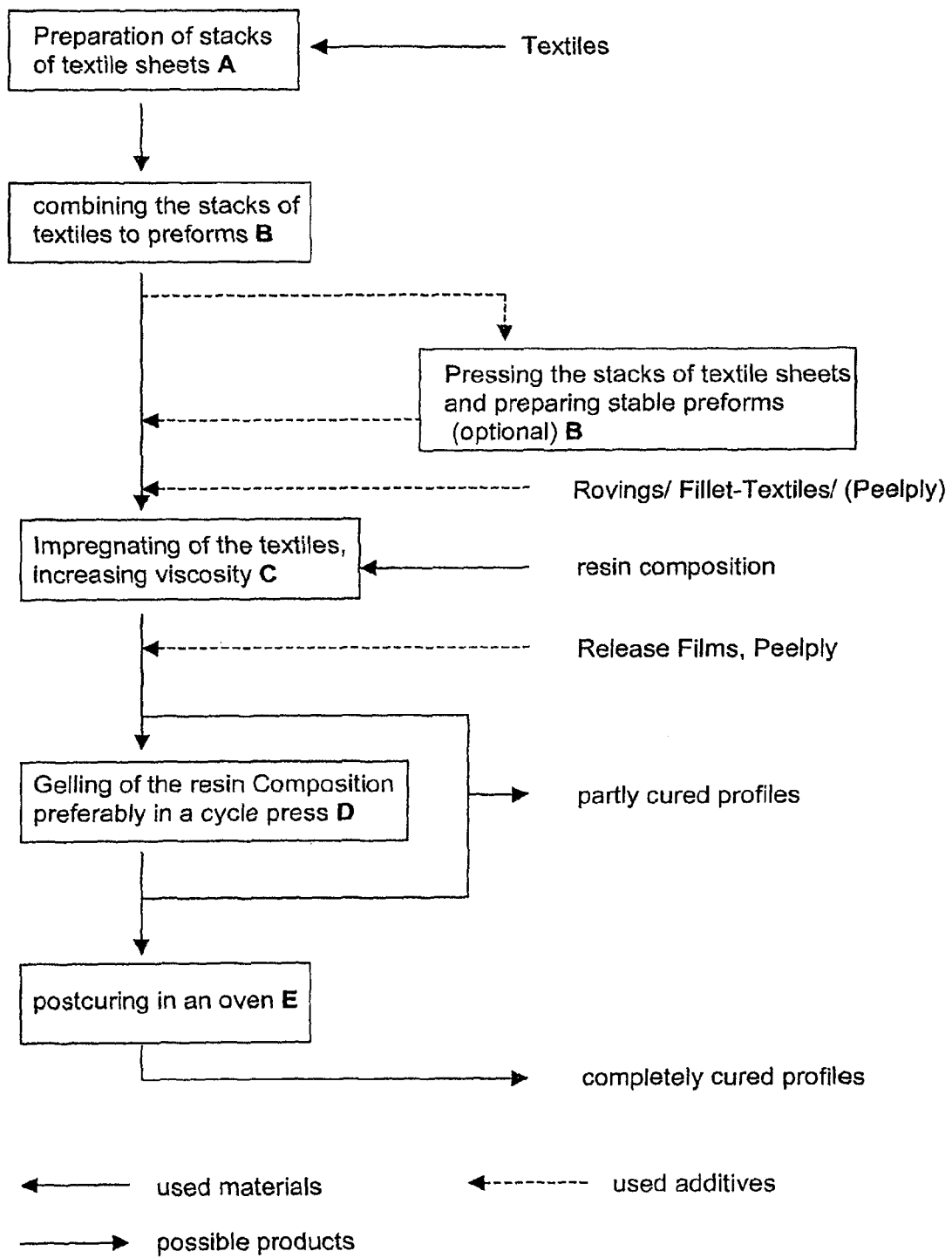
FIG. 5 is a flow-chart which gives an overview over a particularly preferred process of the present invention, the used materials and products obtained by the process.
Figure 6:
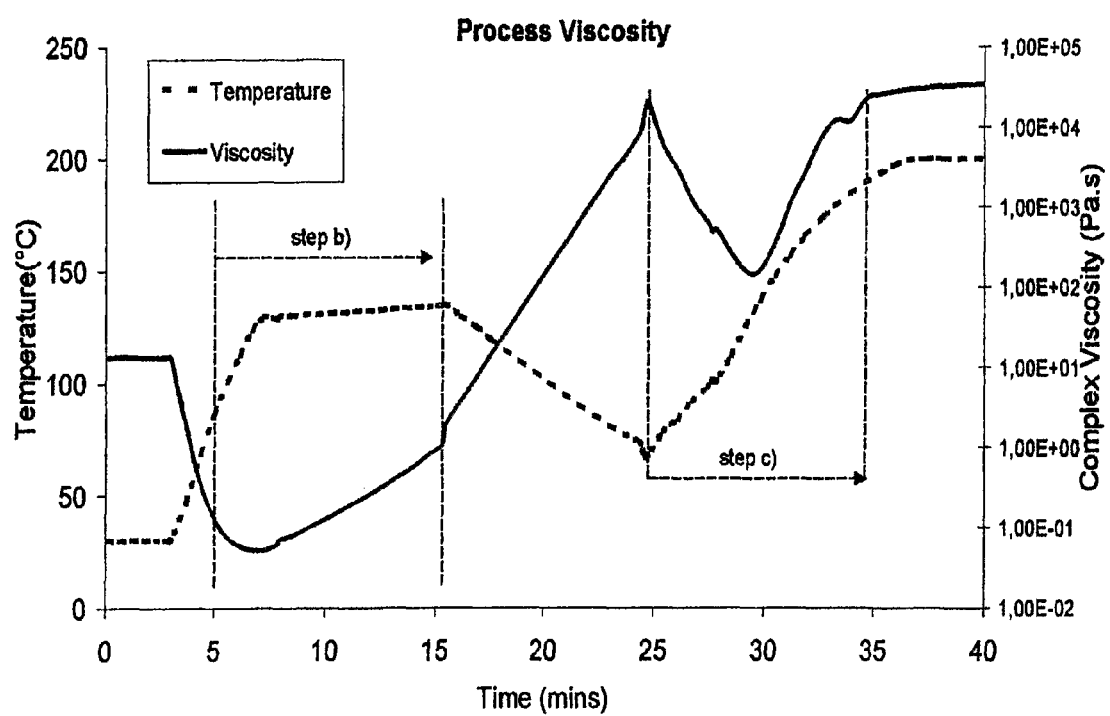
FIG. 6 shows the temperature profile of the process and the viscosity profile of the resin system over the process time for a preferred process of the present invention, indicating beginning and ending of steps b) and c). The viscosity was measured with a parallel plate rheometer at the respective temperature. The process was carried out using a cycle press as described above.

FIG. 3 shows schematically the most preferred embodiment of the present invention wherein the impregnating device is separated from the gelation device and wherein the gelation device is in the form of a cycle press. The preform 10 (which is preferably not solidified) enters the impregnating device and a resin composition is injected at position 11. No crosslinking or only a minor amount of cross-linking occurs in the impregnation device, but the viscosity of the resin composition is increased. Therefore, when the material leaves the impregnating device at position 12 the resin composition is sufficiently viscous to stay in the textile sheets and does not drop. At position 13 the material enters the cycle press and heat and pressure is applied indicated by the arrows. Under heat cross-linking occurs and the resin composition gels. The pressure ensures a constant thickness of the obtained structural profile. During gelation of the resin composition the cycle press moves with the same velocity and in the same direction as the textile sheets until the beginning of the cycle press is at position 13a so that there is no relative movement between the cycle press and the resin impregnated textile sheets. When the beginning of the cycle press is at position 13a the cycle press is removed from the then partially gelled resin composition and moved back to position 13 as quickly as possible where it is again applied to the textile sheets and so on. By this most preferred mode of operation each part of the structural profile is subjected to heat and pressure for several times until sufficient gelling occurred. The textile sheets are continuously transported in direction of arrow 14 during the whole process. This procedure provides structural profiles with a particularly constant thickness and no weak points.

The following examples are illustrative only. They illustrate the effect of textile configuration, using a {55/22.5/22.5/0} lay-up as described above and the effect of resin composition and therewith the difference between gelation/cure procedures.

The following abbreviations have been used.

DETDA Diethyltoluenediamine

PACM Para-Aminocyclohexylmethane

DPDA 4-Aminodiphenylamine

DDS Diaminodiphenylsulfone

MY0510 Triglycidyl-p-aminophenole→trifunctional epoxy resin

MY721 Tetraglycidyldiaminodiphenylmethane→tetrafunctional resin

Hypox RA95 elastomer modified bifunctional epoxy resin

The resin compositions and the textiles used in the examples where prepared in a manner known per se.

Example 3 was prepared using a cycle press, examples 1 and 2 were prepared by carrying out the gelation at the end of the impregnation device. The pullforce was in the range 1 to 2 tons for example 1 and 2 and between 0.3 to 0.6 t for example 3. The structural profile had the form of an I-beam. Viscosity increase in the injection device was between 10 to 20 min, dependent on line speed. The total time of each portion of the structural profile in the cycle press was approximately 6 min (example 3 only). The number of cycles during this time was≈12 to 15.

The resin formulations of example 1 and 2 were identical and were comprised of one multifunctional epoxy, one cycloaliphatic amine, and one aromatic amine. Both curing agents exhibit very different reactivities and are therefore useful when gelation shall occur in the injection device, as described previously. In example 1 biaxial textiles were used in combination with unidirectional tape (UD-tape) to achieve the {55/22.5/22.5/0} lay-up, whereas in example 2 triaxial textiles were used in combination with unidirectional tape (UD-tape) to achieve the same {55/22.5/22.5/0} lay-up. Both lay-ups were comprised of 18 principal plies, each with a carbon fiber areal weight of 270 gsm. In example 1 8 principal plies were combined using polyester stitching yarn which was an integral part of the 4 sheets of biaxial textile, whereas in example 2 12 principal plies were combined using polyester stitching yarn. Consequently, the stitching content of example 2 was higher. The difference in OHC strength as shown in Table 1 was attributed to this difference in stitching content.

In example 3 the same textiles were used as in example 2, but the resin formulation was changed compared to example 2, and gelation was carried out in a different manner, as described above. The higher OHC performance was attributed to the better compression properties of the formulation of example 3.

This was also confirmed by compression strength testing of orthotropic $[0/90°]_{3s}$ laminates which were comprised of 5 harness satin weave fabric and different resins. The fabric was manufactured by Hexcel and its tradename is G926 and had an areal weight of 370 gsm and was made of Tenax 6k HTA 5131 carbon fiber. The structural profiles of example 3 were tested against structural profiles made by conventional RTM technology using standard prepregs for aerospace applications (aerospace grade prepreg resin 6376 of Hexcel Composites and the aerospace grade RTM resin RTM6 of Hexcel Composites). The laminates were tested according to EN 2850 B, as shown in Table 2. Compression testing yielded 808 Mpa for example 3. Compression testing of the prepreg system 6376 from Hexcel Composites comprised of the same fabric yielded approximately 800 Mpa and of the RTM6 resin 797 Mpa.

TABLE 1

|  |  | Example | | |
|---|---|---|---|---|
|  |  | 1 | 2 | 3 |
| Resin | MY721 | 100 | 100 | 50 |
|  | MY0510 |  |  | 25 |
|  | Hypox RA95 |  |  | 25 |
| Hardener | DETDA | 65 | 65 | 30 |
|  | PACM | 35 | 35 | — |
|  | DPDA |  |  | 40 |
|  | (3.3 + 4.4) DDS |  |  | 30 |
| Textile/Lay-up | | | | |
| Multiaxial Textiles from Saertex GmbH | | Biaxial +45°/−45° 540 g/m² Fiber: 12k HTS from Tenax | Triaxial +45°/−45°/0° 820 g/m² Fiber: 12k HTS from Tenax | Triaxial +45°/−45°/0° 820 g/m² Fiber: 12k HTS from Tenax |
| UD-Tape/Textile from Hexcel Fabrics | | 280 g/m² Fiber: 24k HTS from Tenax | 280 g/m² Fiber: 24k HTS from Tenax | 280 g/m² Fiber: 24k HTS from Tenax |
| Composition | | Symmetrical 10 × UD 6 × Biaxial | Symmetrical 6 × UD 4 × Triaxial | Symmetrical 6 × UD 4 × Triaxial |
| Trial parameter | | | | |
| Line-Speed [cm/min] | | 10 | 12 | 6 |
| Injection pressure [Bar] | | 5 | 4.8 | 3 |
| Device temperature | Entering [° C.] | 23 | 17 | 14 |
|  | Injection [° C.] | 103 | 95 | 114 |

TABLE 1-continued

|  |  | Example | | |
|---|---|---|---|---|
|  |  | 1 | 2 | 3 |
| profile | Zone6 [° C.] | 95 | 85 | 105 |
|  | Zone5 [° C.] | 114 | 112 | 120 |
|  | Zone4 [° C.] | 117 | 117 | 136 |
|  | Zone3 [° C.] | 127 | 126 | 130 |
|  | Zone2 [° C.] | 130 | 130 | 120 |
|  | Zone1 [° C.] | 134 | 134 | 120 |
| Press | Press Temperature [° C.] | — | — | 180 |
|  | Pressure [Bar] | — | — | 7 |
| Material Properties | | | | |
|  | OHC [Mpa] | 452 | 435 | 476 |

TABLE 2

| Mechanical Properties | | | |
|---|---|---|---|
| Resin | Example 3 | RTM6 | 6376 |
| Compression Strength [Mpa] according to EN2850 Typ B | 808 | 797 | 800 |

The invention claimed is:

1. Continuous pultrusion process for producing structural profiles wherein
  a) one or more textile sheets are impregnated with a resin composition comprising a combination of
    (i) at least one epoxy resin which is a tri- or tetrafunctional epoxy resin, and
    (ii) a curing agent system comprising at least two types of reactive groups of different reactivity,
  b) the impregnated textile sheets are subjected to heat to cause a partial reaction between the at least one epoxy resin and the curing agent system, so that the viscosity of the resin composition is increased, wherein the initial viscosity is in the range of between 10 and 500 mPa·s and is increased in a controlled manner by a factor of between 5 and 200, while the degree of crosslinking is limited to a degree of curing in the range of between 0% and 10%, and
  c) the partially reacted impregnated resin composition is gelled using heat and/or pressure.

2. Continuous pultrusion process according to claim 1, wherein the at least one epoxy resin has at least one amine group.

3. Continuous pultrusion process according to claim 1 or 2, wherein the at least one epoxy resin is a tetraglycidylamine epoxy resin.

4. Continuous pultrusion process according to claim 1, wherein the curing agent system comprises at least two curing agents having different reactivity.

5. Continuous pultrusion process according to claim 4, wherein the at least two curing agents with different reactivity are amine curing agents.

6. Continuous pultrusion process according to claim 5, wherein the curing agent with the higher reactivity of the curing agents having different reactivity is a cyclic non-aromatic amine and the curing agent with the lower reactivity of the curing agents having different reactivity is an aromatic amine.

7. Continuous pultrusion process according to claim 6, wherein the cyclic non-aromatic amine is para-aminocyclohexylmethane.

8. Continuous pultrusion process according to any of claim 6 or 7 wherein the curing agent with the lower reactivity of the curing agents having different reactivity is a mono-aromatic diamine.

9. Continuous pultrusion process according to claim 1, wherein the partial reaction in step b) is carried out to achieve viscosity in the range of 1000 to 10000 mPa·s.

10. Continuous pultrusion process according to claim 1, wherein the gelling step c) is carried out to a degree of cure of 40% to 75%.

11. Continuous pultrusion process according to claim 1, wherein the gelling step c) is carried out to a degree of cure of 10% to 40%.

12. Continuous pultrusion process according to claim 1, wherein the at least one or more textile sheets are preformed before they are impregnated with the resin composition.

13. Continuous pultrusion process according to claim 12, wherein the preforms are stabilized by compaction.

14. Continuous pultrusion process according to claim 1, wherein the gelling in step c) is effected by applying heat and pressure.

15. Continuous pultrusion process according to claim 14, wherein the heat is from 120° C. to 200° C. and the pressure is from 1 to 20 bar and heat and pressure are applied for a time period of 3 to 20 minutes.

16. Continuous pultrusion process according to claim 14 or 15, wherein the heat and pressure is applied by a cycle press.

17. Continuous pultrusion process according to claim 1, wherein the impregnation in step a) is realized by an injection process.

18. Continuous pultrusion process according to claim 1, wherein the one or more textile sheets are selected from unidirectional tapes and/or multiaxial fabrics.

19. Continuous pultrusion process according to claim 18, wherein the one or more textile sheets are a combination of one or more unidirectional tapes and one or more multiaxial fabrics.

20. Continuous pultrusion process according to claim 1, wherein the gelled product of step c) is subjected to a further step d) curing under heat to a degree of cross-linking of 90% or more.

21. Continuous pultrusion process according to claim 20, wherein the structural profiles are high performance structural profiles for use in the aerospace industry.

* * * * *